(12) United States Patent
Willen et al.

(10) Patent No.: US 7,533,875 B2
(45) Date of Patent: May 19, 2009

(54) CUTTING BOARD SYSTEM

(75) Inventors: Richard Willen, Pittsburgh, PA (US); Michael Lee Miller, Kent, OH (US)

(73) Assignee: Champion Mine Supply, Champion, PA (US)

( * ) Notice: Subject to any disclaimer, the term of this patent is extended or adjusted under 35 U.S.C. 154(b) by 48 days.

(21) Appl. No.: 11/737,857

(22) Filed: Apr. 20, 2007

(65) Prior Publication Data

US 2007/0245573 A1 Oct. 25, 2007

Related U.S. Application Data

(60) Provisional application No. 60/745,233, filed on Apr. 20, 2006.

(51) Int. Cl.
*B23Q 3/00* (2006.01)

(52) U.S. Cl. ............... 269/289 R; 269/302.1; 30/302

(58) Field of Classification Search ............ 269/289 R, 269/302.1; 30/302
See application file for complete search history.

(56) References Cited

U.S. PATENT DOCUMENTS

| | | | |
|---|---|---|---|
| D258,036 S | 1/1981 | Sabin | |
| 5,595,110 A * | 1/1997 | Tseng | .......... 99/483 |
| 5,984,294 A * | 11/1999 | Bogomolny | ............ 269/289 R |
| 6,164,478 A * | 12/2000 | Cant | .......... 220/62.1 |
| 6,422,551 B1 * | 7/2002 | Brotz | .......... 269/289 R |
| 6,536,753 B1 | 3/2003 | Keener | |
| 6,617,004 B2 * | 9/2003 | Lake et al. | .......... 428/138 |
| 6,695,299 B1 | 2/2004 | Brotz | |
| 2002/0195763 A1* | 12/2002 | Benjamin | ........... 269/289 R |
| 2003/0071406 A1* | 4/2003 | Sellers | ............ 269/289 R |
| 2004/0056403 A1 | 3/2004 | Porchia et al. | |
| 2007/0245573 A1* | 10/2007 | Willen et al. | ........... 30/302 |

* cited by examiner

*Primary Examiner*—Lee D Wilson
(74) *Attorney, Agent, or Firm*—Pepper Hamilton LLP

(57) ABSTRACT

A cutting board system may include a rigid base that includes a base top surface, a base bottom surface, and at least one base side contiguous and adjacent with the base top surface and the base bottom surface. A cutting board system may also include a cutting board shell sized and shaped to fit over the base top surface, where the shell includes a substantially flat cutting surface and a gutter positioned adjacent to the at least one base side. The gutter is further positioned to prevent a food component from contacting the rigid base.

18 Claims, 10 Drawing Sheets

CUTTING BOARD SYSTEM

B. CROSS-REFERENCE TO RELATED APPLICATIONS

This patent application claims priority to co-pending U.S. provisional patent application No. 60/745,233, filed on Apr. 20, 2006 entitled "Cutting Board System", the disclosure of which is incorporated herein by reference in its entirety.

C. STATEMENT REGARDING FEDERALLY SPONSORED RESEARCH

Not applicable

D. NAMES OF PARTIES TO A JOINT RESEARCH AGREEMENT

Not applicable

E. SEQUENCE LISTING

Not applicable

F. BACKGROUND

1. Technical Field

The disclosed embodiments generally relate to cutting boards used for food preparation. In particular, this disclosure relates to a cutting board system that minimizes cross-food contamination and improves the ergonomics of food processing.

2. Description of the Related Art

Cutting boards used for processing of foods are pervasive in restaurants and domestic kitchens. A typical restaurant may have five or more cutting boards. Traditionally, cutting boards have been made of a hardwood, such as maple, oak, or ash. However, concerns about sanitizing a wooden cutting board has led to the increased use of other materials. Polymeric materials, or plastics, such as for example, high density polyethylene (HDPE) are non-porous and easier to clean. HDPE board surfaces get damaged after repeated use as knives cut into the surface. The cut marks in the surface provide locations where bacteria can thrive, Sanitization of plastic cutting boards becomes as critical as it is for wooden cutting boards.

Because of a high volume of food preparation and concerns regarding cross-contamination of bacteria from different types of foods, a restaurant kitchen may have 5 or 6 cutting boards in use at any given time. Separate boards are required to process, cut, slice, or chop different foodstuffs. Alternatively, a single cutting board would have to be washed and sanitized before use with different foodstuffs. This is costly, time consuming and impractical in a restaurant setting.

Since even plastic cutting boards become damaged and need to be periodically replaced, the cost of maintaining a supply of useable cutting boards is significant to a restaurant or other food processing facility.

When multiple cutting boards are used in a restaurant, they will have to be washed and sanitized at times throughout the hours of operation, and finally at the end of the day.

Further, to prevent conventional cutting boards from moving or sliding during food processing, typically a wet towel is placed underneath the board. This is effective, but it can be unsanitary. An efficient means to stabilize the board during cutting is desirable.

Accordingly, there is a need for an improved cutting board that is stable, expedites the processing of foods, and reduces the possibility to contaminate food due to cross-contamination from processing different food types, or accidental contamination from food juices running off of the cutting board.

The disclosure contained herein describes attempts to address one or more of the problems described above.

G. SUMMARY

In embodiments, a cutting board system may include a rigid base that may include a base top surface, a base bottom surface, and at least one base side contiguous and adjacent with the base top surface and the base bottom surface. A cutting board system may also include a shell sized and shaped to fit over the base top surface. The shell may further include a cutting surface and a gutter positioned adjacent to the at least one base side, wherein the gutter is further positioned to prevent a food component from contacting the rigid base.

In other embodiments, a cutting board system may include a plurality of shells, where each of the plurality of shells is color-coded for a specific food type.

In some embodiments, the shell may further include a built-in anti-microbial Agent.

In embodiments, a cutting board may include at least one securing structure that removably secures the shell to the base. In further embodiments, the at least one securing structure may include at least one clamping mechanism, where a portion of the clamping mechanism is integral with the shell and positioned to clamp the shell to the rigid base.

At least one support structure may be affixed to the base bottom surface, in embodiments, where the at least one support structure is positioned to stably elevate the rigid base off a working surface.

In some embodiments, a cutting board system may further include a pliable sheet positioned between the base top surface and the shell.

In more embodiments, a cutting board system may have a gutter with an interior wall portion that extends downward from the cutting surface at an angle of about 0° to about 30°.

In some embodiments of a cutting board system, the cutting surface may be of a matted polymeric material.

In embodiments of a cutting board system the rigid base may further include at least one alignment slot. For several embodiments, the shell may further include a shell bottom side, where the shell bottom side may include at least one fin. In embodiments, the at least one fin may be positioned to fit into the at least one alignment slot of the rigid base. In still more embodiments, the at least one fin of each of the at least one shell may be positioned to allow air drying of the cutting surface when shells are stacked on each other.

In still further embodiments, a cutting board system may include a rigid base, where the rigid base includes at least one base top upper surface, a base bottom surface, at least one base side contiguous and adjacent with the base top upper surface and base bottom surface, at least one base top lower surface, and at least one lower base top side contiguous with the base top upper surface and the base top lower surface. In yet further embodiments, a cutting board system may include at least one shell that may be sized and shaped to fit over the at least one base top upper surface. The shell may include a substantially flat cutting surface and a gutter positioned adjacent to the at least one base side and the at least one lower base top side, where the gutter is further positioned to prevent a food component from contacting the rigid base.

In some embodiments, a cutting board system may include a securing structure that removably secures the at least one shell to the base.

Yet other embodiments may include at least one support structure affixed to the base bottom surface, where the at least one support structure is positioned to stably elevate the rigid base off a working surface.

Some embodiments may further include at least one pliable sheet positioned between the at least one base top upper surface and the at least one shell.

In still more embodiments, the gutter may further include an interior wall portion that extends downward from the cutting surface at an angle of about 0° to about 30°.

In still more embodiments, the rigid base may include an insert.

In yet other embodiments, the rigid base may further include at least one alignment slot. In embodiments, the at least one shell may further include a shell bottom surface, where the shell bottom surface may include at least one fin. In embodiments, the at least one fin may be positioned to fit into the at least one alignment slot of the rigid base. In still more embodiments, the at least one fin of each of the at least one shell may be positioned to allow air drying of the cutting surface when shells are stacked on each other.

A method for hygienically processing a variety of foods may include providing a rigid base, where the rigid base is elevated from a working surface by at least one supporting structure. Removably securing a sanitized first cutting board shell to the rigid base, where the first cutting board shell may include a cutting surface and a gutter. In embodiments, the gutter may be positioned to collect a first food component from the cutting surface and to prevent the first food component from contacting the rigid base. Embodiments of a method may include processing a first food on the cutting surface to form a processed first food on the cutting surface and the first food component in the gutter. After processing a method may include removing the processed first food from the cutting surface, and draining the first food component from the gutter. In embodiments, the first cutting board shell may be removed from the rigid base. In some embodiments, a sanitized next cutting board shell may be removably secured to the rigid base. The next cutting board shell may include a next cutting surface and a next gutter, and the next gutter of the next cutting board shell may be positioned to collect a next food component from the next cutting surface and to prevent the next food component from contacting the rigid base. In embodiments, a next food may be processed on the next cutting surface to form a processed next food on the cutting surface and the next food component in the next gutter. Still further embodiments may include removing the processed next food from the cutting surface, draining the next food component from the gutter, and removing the next cutting board shell from the rigid base.

Still more embodiments may include repeating the steps of removably-securing a sanitized next cutting board shell to the rigid base, through the step of, removing the next cutting board shell from the rigid base, until all of a variety of foods are processed.

H. BRIEF DESCRIPTION OF THE DRAWINGS

I. DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
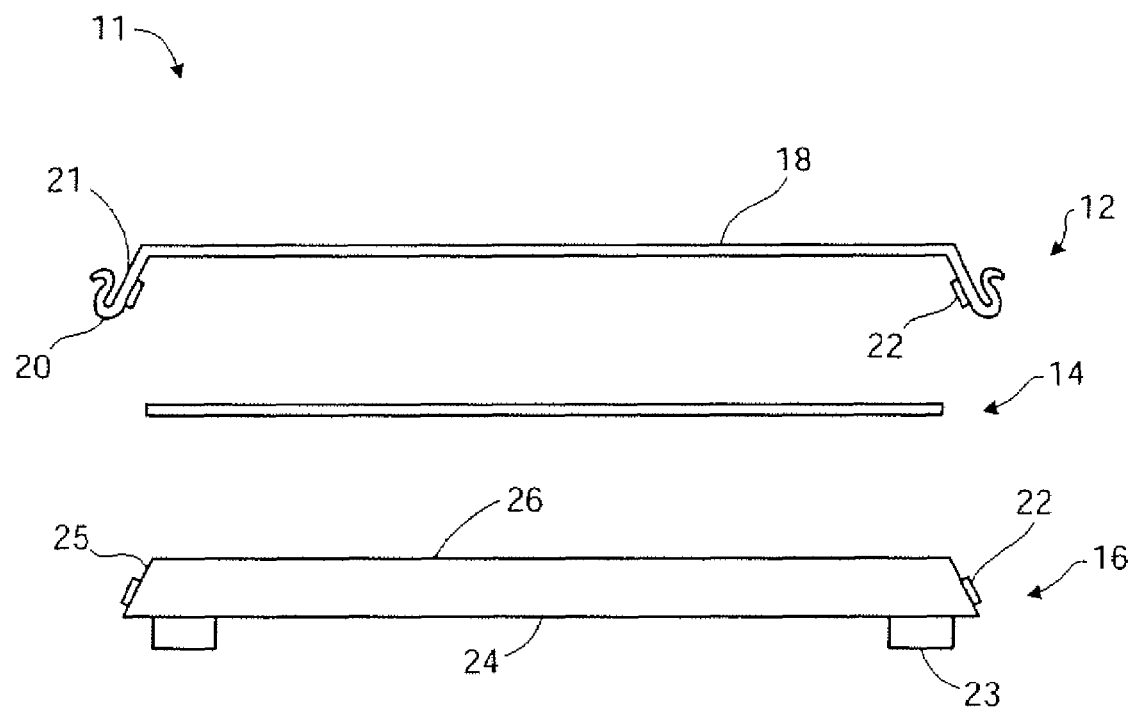
FIG. 1 depicts, in cross-section, an exemplary cutting board system of this disclosure.

In accordance with one embodiment, as illustrated in FIG. 1, a cutting board system 11 is disclosed in an exploded cross-sectional view. The cutting board system 11 includes a cutting board shell 12, an optional pliable sheet 14 and a stable rigid base 16. The shell 12 includes a flat or substantially flat cutting surface 18 and a gutter 20 located at or near the perimeter of the cutting surface 18. In an embodiment the gutter 20 is trough-shaped. In various embodiments, the cutting surface 18 may be smooth, or it may be matted, rough, granular, or otherwise textured. The shell 12 and the rigid base 16 may include securing structures 22 that are in position to interlock the shell 12 with the rigid base 16. The securing structures 22 may be Velcro® strips, clamping mechanisms, or other interlocking mechanisms. The securing structures 22 may be anything that locks or holds the shell 12 to the rigid base 16, for example but not limited to a tongue and groove arrangement. The securing structures 22 prevent the shell 12 from moving on the rigid base 16.

The rigid base 16 may also include at least one support structure 23 that stably elevates the rigid base 16 from the countertop or other surface. For example, the support structures 23 may be rubber or plastic feet on the bottom surface 24 of the rigid base 16. The support structures 23 can be fixed to the bottom surface 24 of the rigid base 16 with screws (not shown), adhesives, by press fitting them over posts, or by any other means suitable for attachment of the support structures 23. In one embodiment the screws that fix the support structures 23 may be stainless steel screws. Any means of stabilizing a base 16 with respect to movement during food processing is encompassed in this disclosure. For example, but not limited to, the base 16 may have holes drilled through it so that the holes fit onto pegs that are fixed to a surface or countertop. The countertop, for example, but not limited to, may be the top of a restaurant counter, refrigerator or freezer, In some embodiments, the base 16 is rectangular, having four base sides 25 that are contiguous with the base top surface 26 and the base bottom surface 24. The base 16 does not have to be rectangular in shape, but could be for example, but not limited to, oval in shape. In an oval embodiment, there is only one base side 25 that is contiguous with the base top 26 surface and the base bottom surface 24. In one embodiment, the base 16 is rectangular with dimensions of approximately 18 inches by approximately 24 inches. In yet another embodiment, the base 16 is rectangular with dimensions of approximately 15 inches by approximately 20 inches. The dimensions and shape of the base 16 are not critical for practice of embodiments herein. Any shape or size of a cutting board system 11 is encompassed herein. The shell 12 may be sized and shaped to correspond to the base 16.

Figure 2:
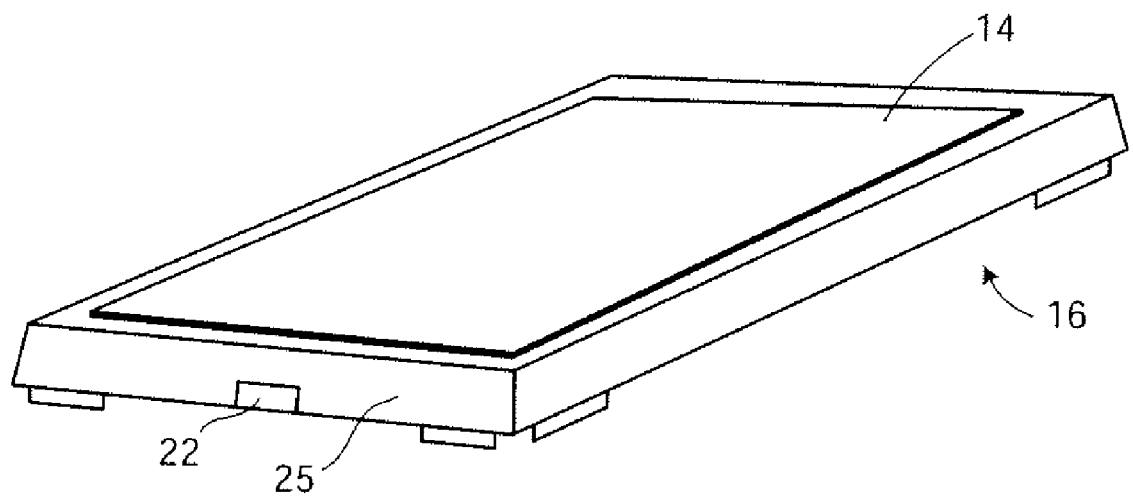
FIG. 2 illustrates a top view of the rigid base overlaid with a pliable sheet.

Now referring to FIG. 2, an overhead view of the rigid base 16 is shown with the pliable sheet 14 overlaying the rigid base 16. A securing structure 22 is shown on one rigid base side 25. In one embodiment, the pliable sheet 14 fully covers the rigid base 16, but it is recognized that the pliable sheet 14 could partially cover the rigid base, or that the pliable sheet 14 may not be used at all.

Figure 3B:
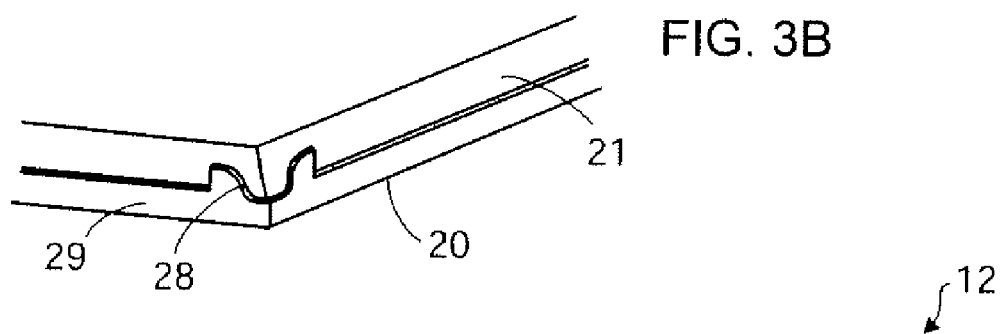
FIG. 3B depict a blowup of an exemplary gutter and spout of a shell.
Figure 3A:
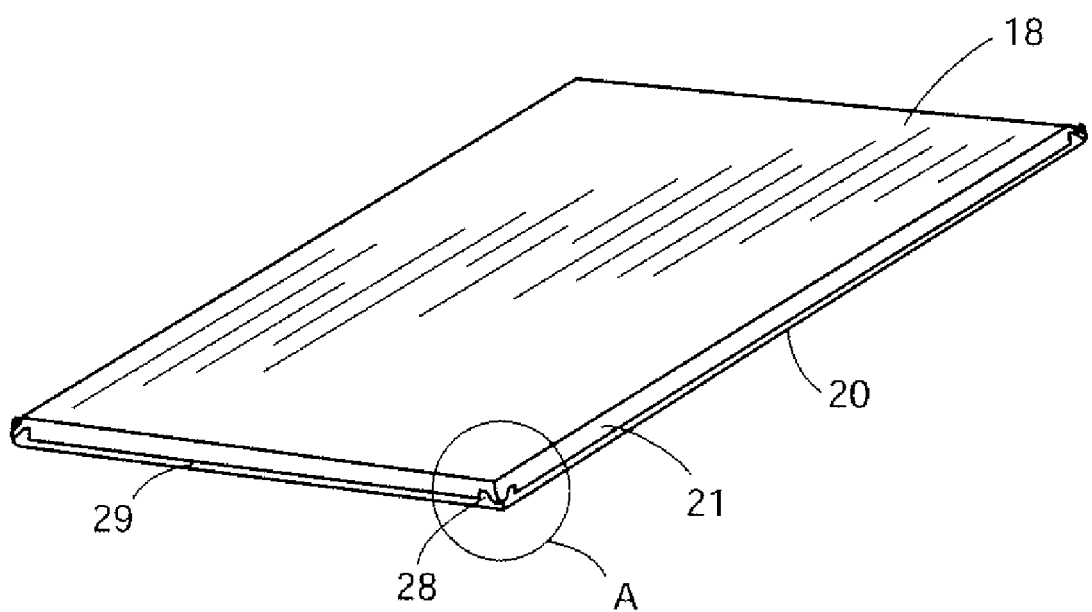
FIG. 3A depicts an overhead view of a shell, including a cutting surface, gutter, and spout.

FIG. 3A is an overhead view of an exemplary shell 12 of this disclosure. FIG. 3B is a blowup of the circled section A of FIG. 3A. The shell 12 has a cutting surface 18 and a gutter 20. The gutter 20 includes an interior wall portion 21 (see also FIG. 1) that extends down from the cutting surface 18 at an angle of between 0° and 30°, or preferably between 6° and 25°, or more preferably between about 13° and 15° off of normal. The gutter 20 may be in the form of a trough and its purpose is to collect liquids that may accumulate during food processing. Optionally, the gutter 20 may include one or more pouring spouts 28 that facilitate drainage of the gutter 20. A pouring spout 28 may be located on the corner of the gutter 20 of a shell 12.

In a further embodiment, the shells 12 could be color coded for use with specific foods. Blue shells 12, for example, could be use for cutting cooked foods, whereas green shells 12 could be used for cutting produce. In still a further embodiment, a base 16 may be black, or of any other color not used for the shells to remind users that food should not be directly cut or otherwise processed on the base 16.

An embodiment may include a spout 28 that may be higher than the cutting surface 18. In these embodiments, the shell can be stacked after washing and sanitizing, whereby the spouts allow the cutting surfaces to be open to facilitate drying of the shells 12, when cleaned shells 12 are stacked together. In another embodiment, a spout 28 that extends above the outer wall 29 of the gutter 20 but not necessarily above the cutting surface 18 would also facilitate drying of the shell. Alternatively, the spout 28 may extend above both the outer gutter wall 29 and the cutting surface 18.

While spouts 28 are depicted in the embodiment of FIGS. 3A and 3B, it is recognized that any mechanism that is useful for draining the gutters 20, for example, but not limited to, a gutter hole with a plug will work for the cutting board system 11. Any feature that enables draining of the gutter 20 is contemplated for this disclosure. In some embodiments, a spout or gutter hole need not be included at all.

The exemplary embodiment of FIG. 1 depicts one shell 12 and one pliable sheet 14 on one rigid base 16, however it is recognized that combinations including one or more of each element with one or more other elements may be embodied in the instant disclosure of a cutting board system 11.

Figure 4:
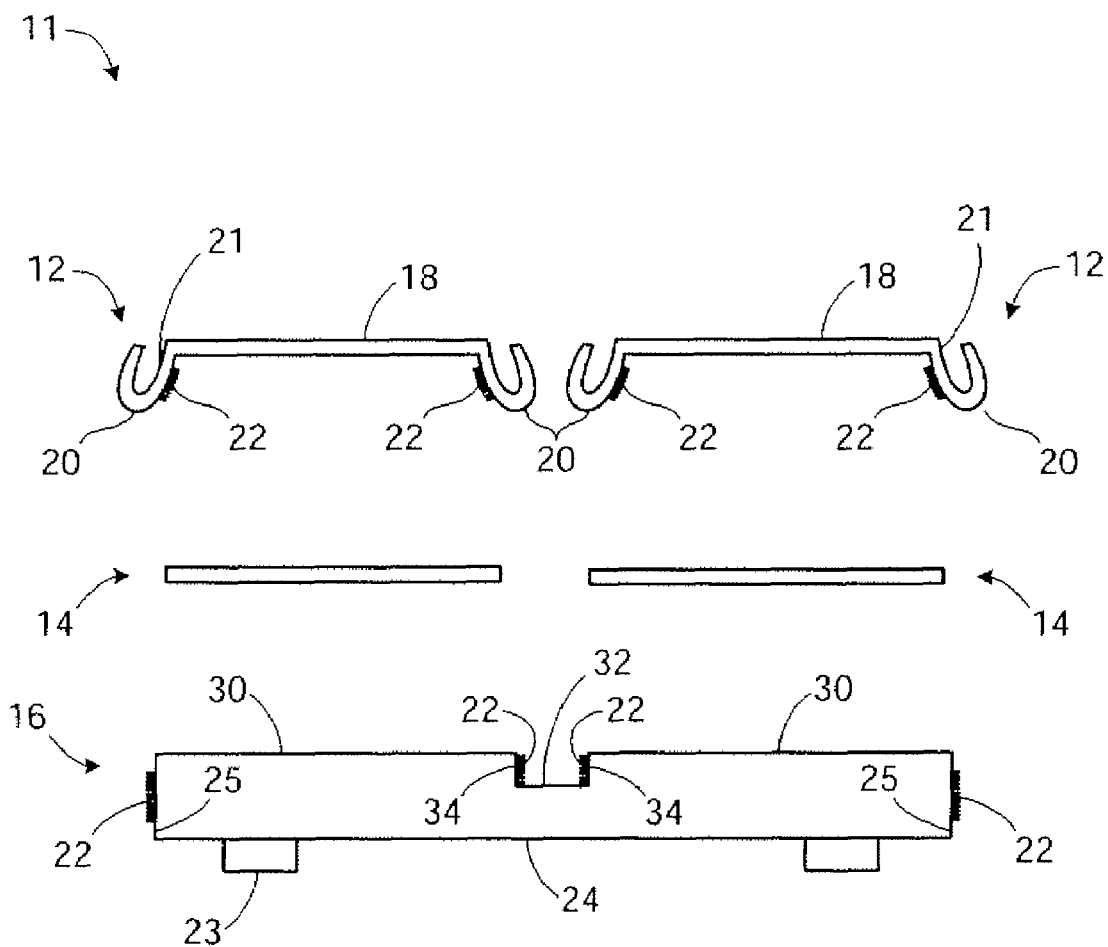
FIG. 4 depicts, in cross-section, an exemplary cutting board system of this disclosure showing two shells and two pliable sheets on one rigid base.
Figure 5:
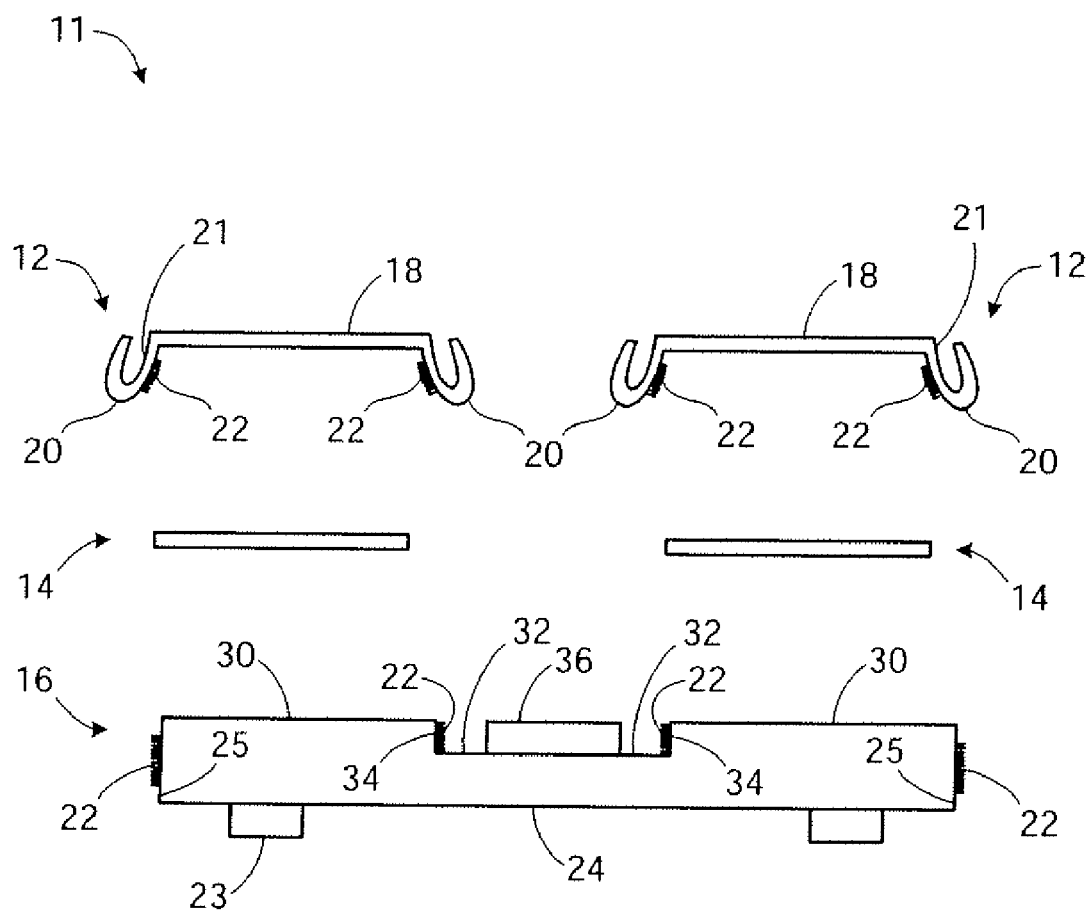
FIG. 5 depicts, in cross-section, an exemplary cutting board system of this disclosure showing two shells, two pliable sheets on a base that includes a base insert.
Figure 6A:
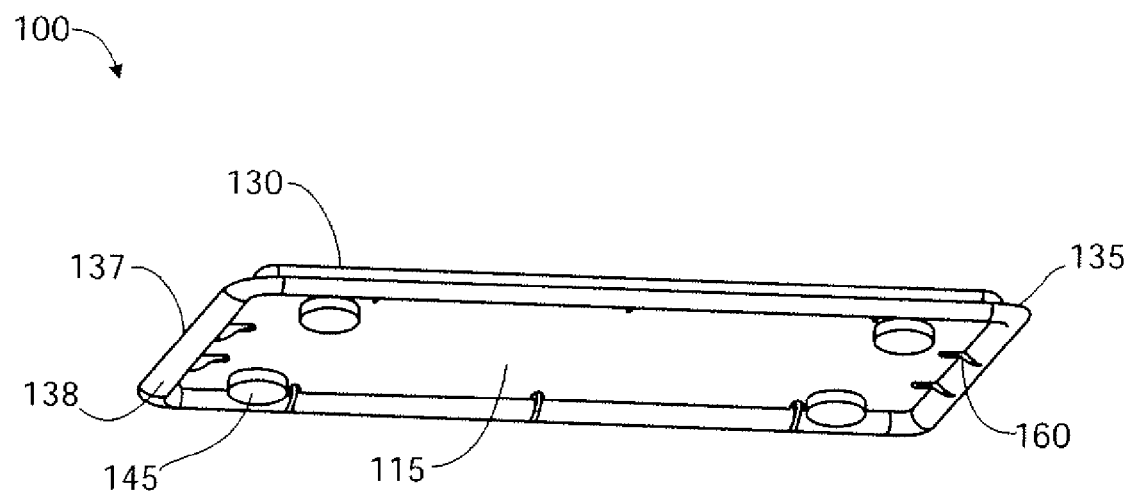
FIG. 6A depicts an underside perspective view of an embodiment of a cutting board system.
Figure 6B:
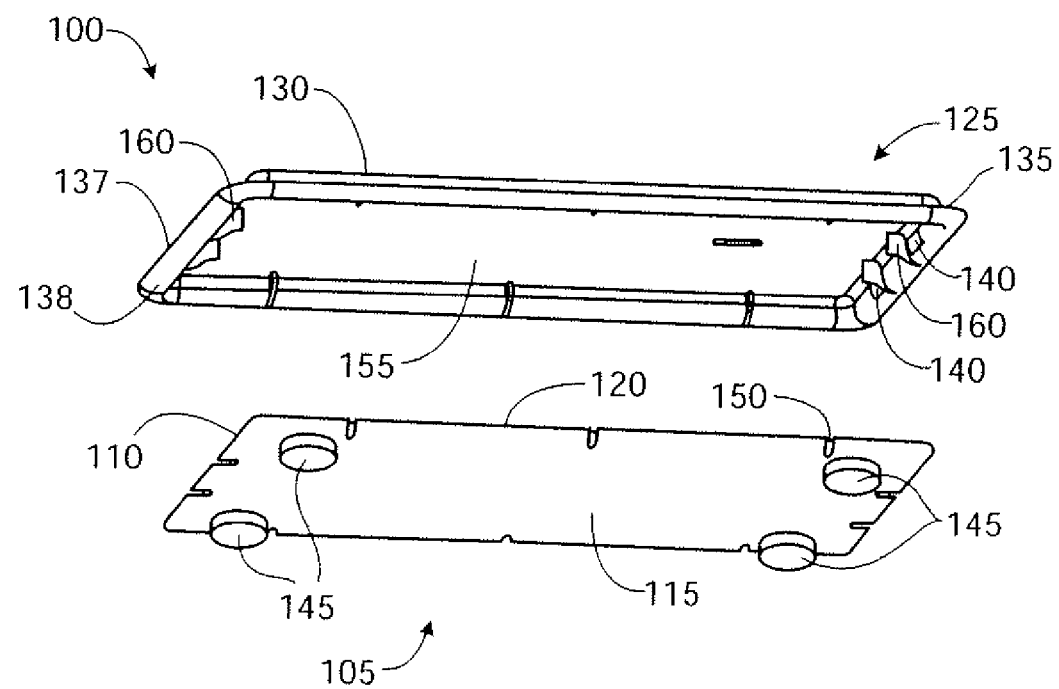
FIG. 6B depicts an exploded underside perspective view of an embodiment of a cutting board system.

FIG. 4 and FIG. 5 depict cross-sectional views of exemplary cutting board systems 11 that include two shells 12 and two or more pliable sheets 14 on a single rigid base 16. Referring now to FIG. 4, the cutting board system 11 includes a rigid base 16. The rigid base 16 has at least one substantially flat top upper surface 30, a base bottom surface 24, at least one base top lower surface 32, and at least one lower base top side 34. The lower base top side 34 is contiguous with the base top upper surface 30 and the base top lower surface 32. At least one cutting board shell 12 is sized and shaped to fit over at least one base top upper surface 30. Typically, one shell 12 fits over one base top upper surface 30. However, it is recognized that one shell 12 may also be sized and shaped to fit over more than one base top upper surface 30. The at least one shell 12 has a substantially flat cutting surface 18 and a gutter 20. The gutter 20 may be positioned adjacent to the at least one base side 25 and the at least one lower base top side 34.

In some embodiments, the exemplary cutting board systems 11 of FIG. 4 and FIG. 5 also have securing structures 22 that removably secure the at least one shell 18 to the rigid base 16.

Supporting structures 23 may be affixed to the bottom surface 24 of the rigid base 16. In an embodiment the supporting structures 22 include rubber feet that are affixed to the base bottom surface 24 using stainless steel screws (not shown). It is recognized that any type of supporting structure that will support and stabilize the base 16, plus any suitable way to affix the supporting structures 23 to the base bottom surface 24 are encompassed in the embodiments herein.

In an embodiment, at least one pliable sheet 14 is positioned between at least one base top upper surface 30 and at least one shell 12. In a further embodiment, the pliable sheet(s) 14 may have a color that is different from a color of the shell 12. The difference in color facilitates recognition of the shell 12 being cut or otherwise damaged.

An embodiment of a gutter 20 of the cutting board system 11 has an interior wall portion 21. In one embodiment the interior wall portion 21 extends downward from the cutting surface 18 at an angle of about 0° to about 30°. In another embodiment, the interior wall portion 21 extends downward from the cutting surface 18 at an angle of about 6° to about 25°. All angles that are effective in allowing liquids or food "juices" drain from the cutting surface into the gutter are within the scope of embodiments herein. In still another embodiment, the interior wall portion 21 extends downward from the cutting surface IS at an angle of about 13° to about 15°.

In an embodiment the gutter 20 further includes at least one spout 28. The spout facilitates drainage of waste liquids or food components that may accumulate during the processing of foods. It is recognized that any method of draining the gutter, for example, but not limited to, a drain hole (not shown) in the gutter 20 and plug (not shown) are encompassed in these embodiments. It is also recognized that no gutter draining mechanism is required for embodiments herein.

The shell 12 may be fabricated from a polymeric material, such as, but not limited to, high density polyethylene (HDPE), polypropylene, and polystyrene. The cutting surface may be smooth, roughened, malted, or otherwise textured.

Now referring to FIG. 5, in an embodiment, the rigid base 16 includes an insert 36. The insert 36 may be situated so that is between shells 12 of the cutting board system 11 as depicted in FIG. 5, or the insert 36 may be situated on the edge of the rigid base 16. The insert 36 may serve different functions. For example, without limitations, the insert 36 may serve as a knife rest. In another embodiment the insert 36 may be made of a material that makes it suitable to hold a hot pot or pan or other cooking utensil, which facilitates removal of foodstuffs from the cooking utensil to the cutting surface is of the shell 12. In the embodiments where the insert 36 could be used to hold hot cooking utensils or to serve as a hot pad, the insert 36 may be fabricated from, but not limited to, a ceramic material, or other material with a low thermal conductivity.

An embodiment of the cutting board system 11 described herein provides a stable, rigid base 16, a substantially flat cutting board shell 12 that is sized and shaped to fit over at least a portion of the rigid base 16, and a pliable sheet 14 positioned between the rigid base 16 and shell 12. The shell 12 is typically thinner than the base 16, has a cutting surface 18, and has a gutter 20 to collect liquids. A shell 12 may be significantly less expensive than a conventional cutting board, which allows the shell 12 to be disposable in nature, if desired. It should be recognized that the term "disposable" as used herein does not necessarily limit the invention to single-use materials. Embodiments of shells 12 described herein may be re-used for multiple operations.

The cutting board system 11 may be constructed using my materials that would prove to be suitable for food processing, chopping, and cutting. For example, the shell 12 and/or the rigid base 16 could be fabricated from high density polyethylene (HDPE), foamed HDPE, polystyrene, polypropylene or other polymeric material or even wood or a wooden laminate. The pliable sheet 14 could be a soft plastic, a plastic foam, or a rubber material, or any other material that is pliable.

A further embodiment of a cutting board system 100 is depicted in FIGS. 6A, 6B, 7A, and 7B. An exemplary embodiment of a cutting board system 100 may include a rigid base 105 that includes a substantially flat base top surface 110, a base bottom surface 115 and at least one base side 120 that is contiguous and adjacent with the base top surface 110 and the base bottom surface 115.

Embodiments include a cutting board shell 125 that is sized and shaped to fit over the base top surface 110. The shell 125 may include a substantially flat cutting surface 130, and a gutter 135 that is positioned adjacent to the at least one base side 120 and further in a position to prevent a food component from contacting the rigid base 105 during food processing and cleanup. The gutter 135 may contain a drip edge 137 that is lower in elevation than the cutting surface 130. In an embodiment, the drip edge 137 may be about 0.75 inches below the cutting surface 130. The bottom of the gutter 138 may also be below the elevation of the base bottom surface 115. In an embodiment, the bottom of the gutter 138 may be about 0.5 inches below the base bottom surface 115. This arrangement allows food components or liquids to collect in the gutter 135, and if liquid in the gutter 135 overflows the drip edge 137, it drips off the bottom of the gutter bottom 138 without coming into contact with the base 105, reducing the chances of cross-contamination that can be caused by the processing of different types of food.

In an embodiment, a cutting board shell 125 may have a width of about 19 inches, a length of about 26 inches, and a total height of about 1.125 inches. An alternate height may be about 1.625 inches. Other dimensions for the height, width, and length of cutting board shells are possible. In an embodiment, the thickness of the material of a shell 125 may be about 0.156 inches, The cutting surface of a cutting board shell may have a width of about 16 inches and a length of about 23 inches. Other cutting surfaces may include a width of about 10 inches and a length of about 23 inches. It is realized that these dimensions are exemplary, and are not meant to be limiting. Any dimensions are within the scope of embodiments herein.

In an embodiment, the dimensions of a rigid base 105 may be include a width of about 16.7 inches, a width of about 23.7 inches, and a thickness of about 0.5 inch. These exemplary dimensions correspond to the exemplary dimensions of the cutting board shell 125 hereinabove, so that the exemplary shell 125 may fit snugly over the base 105.

Exemplary cutting board systems 100 may include at least one securing structure 140. In the embodiments of a cutting board system as depicted in FIGS. 6A-7B, the securing structures 140 include at least one clamping mechanism or snapping mechanism (herein both referred to as a clamping mechanism). The clamping mechanism of a securing structure 140 may be an integral portion of the cutting board shell 125 and may be positioned to clamp the shell 125 securely to the rigid base 105. In embodiments, two clamping mechanisms of a securing structure 140 may be present on one end of the shell 125, with one securing structure on the other end of the shell (not shown in FIGS. 6A-7B). In these embodiments the two securing structures 140 at one end of the shell 125 may be secured to the base 105 by engaging the securing structures 140 on one end of the shell 125 with one end of the base 105. The securing structure (not shown) at the opposite end of the shell 125 can then be engaged with the opposite end of the base 105 by pushing the shell 125 down onto the base 105 so that the securing structure (not shown) at the opposite end of the shell 125 engages with or snaps to the base 105 to securely and removably affix the shell 125 to the base 105.

Likewise, but in reverse, to remove the shell 125 from the base 105, the securing structure (not shown) at the opposite end of the shell 125 is disengaged, the shell 125 may be lifted slightly and the two securing structures 140 at the other end of the shell 125 are disengaged by sliding the shell out of the clamping mechanisms of the two securing structures 140, so that the shell 125 can ten be removed from the base 105.

In embodiments, the two securing structures 140 on one end of the shell 125 may be about 1.25 inches long, whereas the securing structure 140 at the other end of the shell 125 may be about 0.625 inches long. Details of designs of securing structures would be obvious to one of ordinary skill in the art without excessive experimentation, and do not need to be further expounded upon herein.

It is recognized that other types and numbers of securing structures are encompassed in embodiments herein, and that the depiction described above and in FIGS. 6A-7B are exemplary and not meant to be limiting. Other types of securing structures, such as for example, but not limited to, Velcro® fasteners and tongue and groove mechanisms are embodied herein. Any type of mechanism, which is known now or hereafter to one of ordinary skill in the art that can removably secure the shell to the base is within the scope of embodiments herein. Any numbers of securing structures that effectively removably secure the shell to the base are encompassed herein. Further, the securing mechanisms are not required to be integral with the shell, but may be integral with the base, or may be a part of the base and the shell. Alternatively, a securing member may be a mechanism that is separate from the shell and the base, but is capable of removably securing the shell to the base.

In embodiments, at least one support structure 145 may be affixed to the base bottom surface 115 and is positioned to stably elevate the base 105 off of a working surface or countertop. The at least one support structure 145 may be a rubber or plastic foot that is attached to the base bottom surface 115, and inhibits the cutting board system from sliding on a working surface during processing of food. The at least one support structure 145 may be attached to the bottom surface by an effective means, such as for example, but not limited to, an adhesive or a mechanical fastener. In one embodiment, the support structures may be attached to the bottom surface by using stainless steel screws. Alternatively, the support structures may be an integral part of the base, and may be formed at the same time as the base, as for example, as a boss in an injection molding process. The support structures may also contain a cap or donut of rubber, or other material that inhibits the cutting board system from sliding on a working surface during processing of food. In a non-limiting example, the support structures 145 may elevate the base bottom surface 115 about 1.25 inches from the working surface or countertop. In the embodiments of FIGS. 6A-7B, four support structures, or feet, are depicted. Any number of feet that effectively and stably support the cutting board system off of a working surface or countertop are within the scope of embodiments herein.

Now referring to FIGS. 6A-9C a rigid base 105 may include at least one alignment slot 150. In some embodiments the shell 125 may further include a shell bottom side 155. A shell bottom side 155 may include at least one fin 160. The fins 160 may be positioned to align and fit into the alignment slots 150 of the rigid base 105. In embodiments, the fins 160 may be loose in the slots 150 and primarily serve to align a shell 125 with a base 105, and not necessarily to secure the shell 125 to the base 105.

Figure 7A:
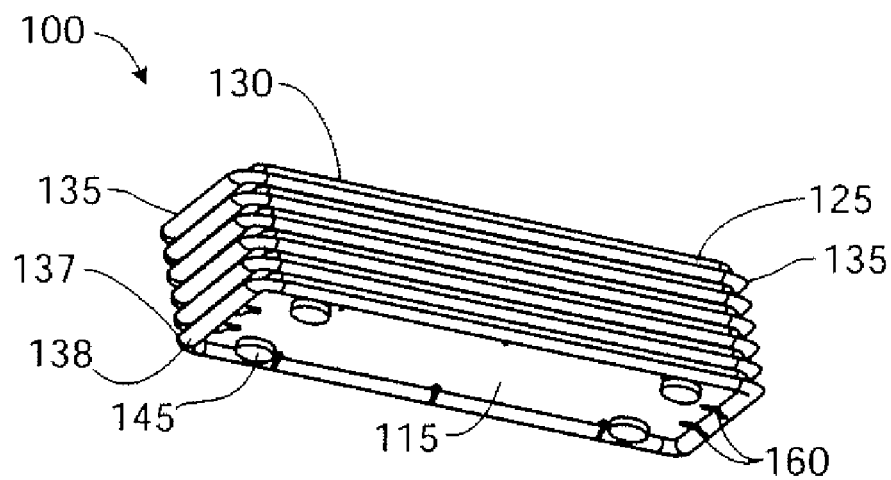
FIG. 7A depicts an underside perspective view of an embodiment of a cutting board system showing a plurality of cutting board shells stacked in an air drying position.
Figure 7B:
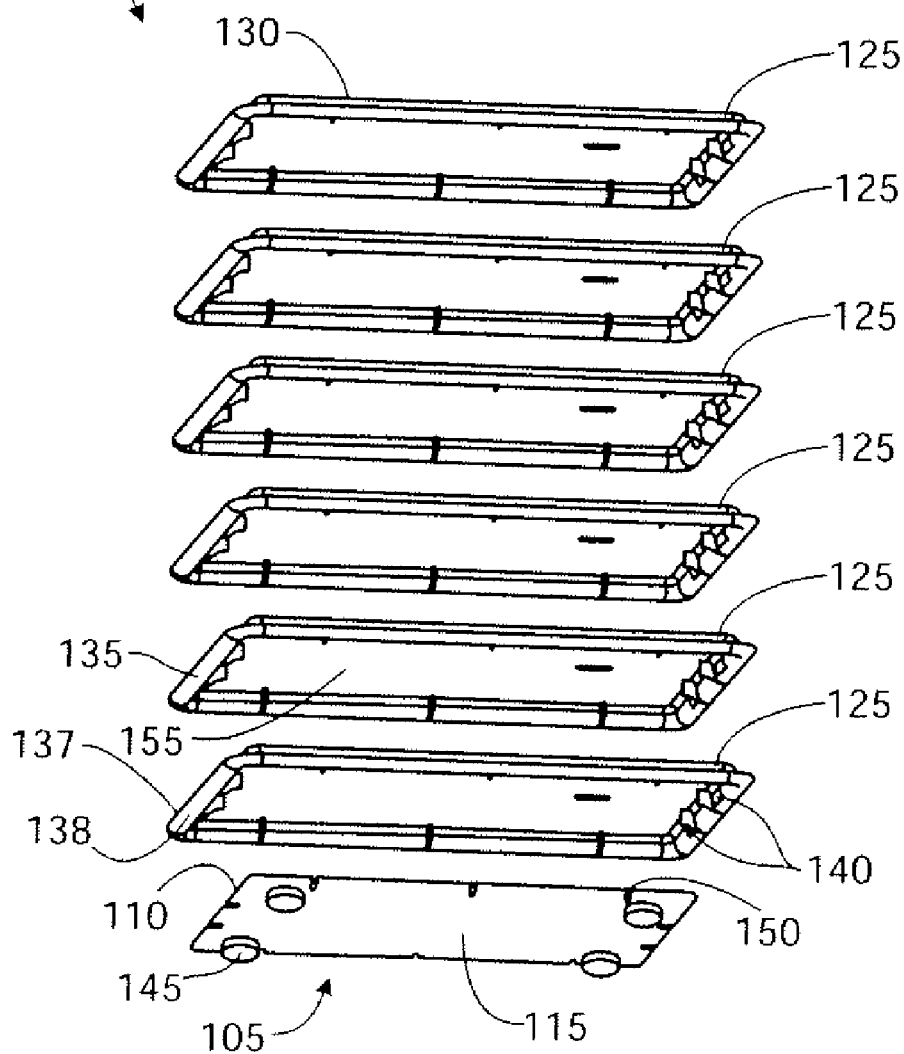
FIG. 7B depicts an exploded underside perspective view of an embodiment of a cutting board system showing a plurality of cutting board shells stacked in an air drying position.
Figure 8A:
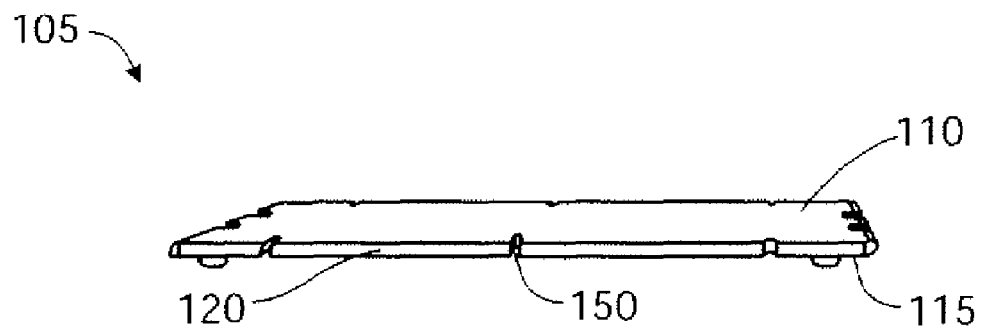
FIG. 8a depicts a side perspective view of an embodiment of a rigid base.
Figure 8B:
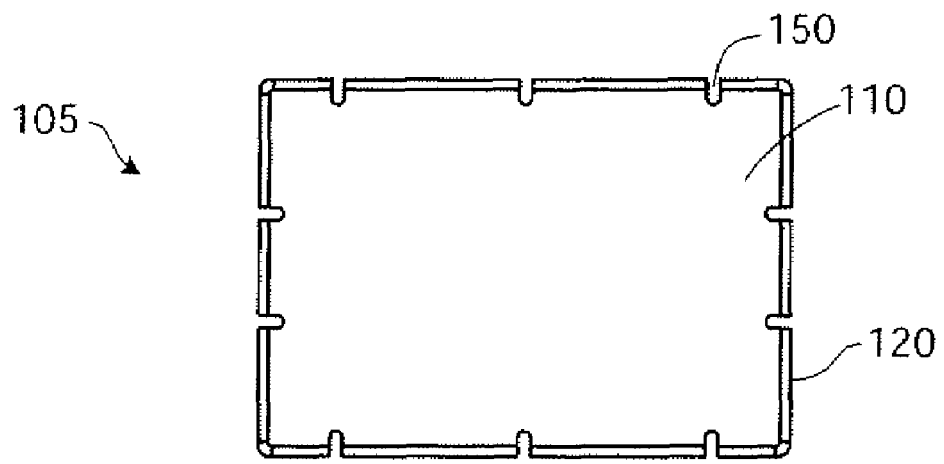
FIG. 8b depicts a top-side view of an embodiment of a rigid base.
Figure 8C:
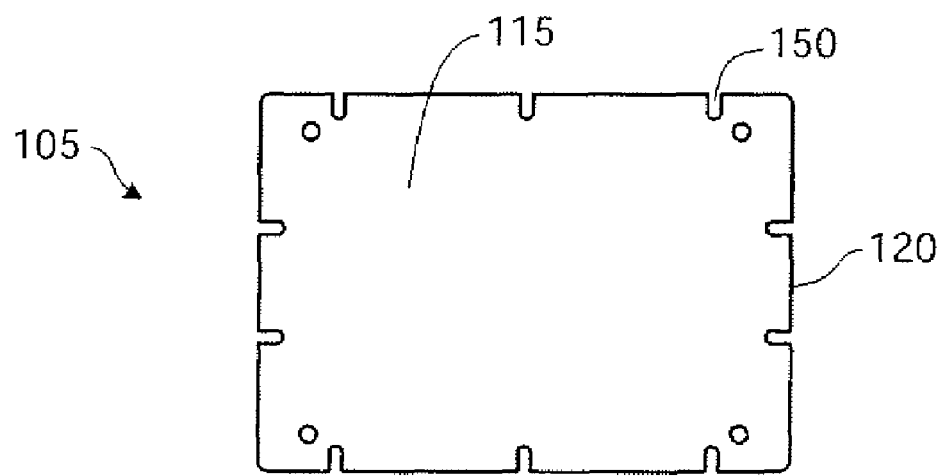
FIG. 8C depicts a bottom-side view of an embodiment of a rigid base.
Figure 9A:
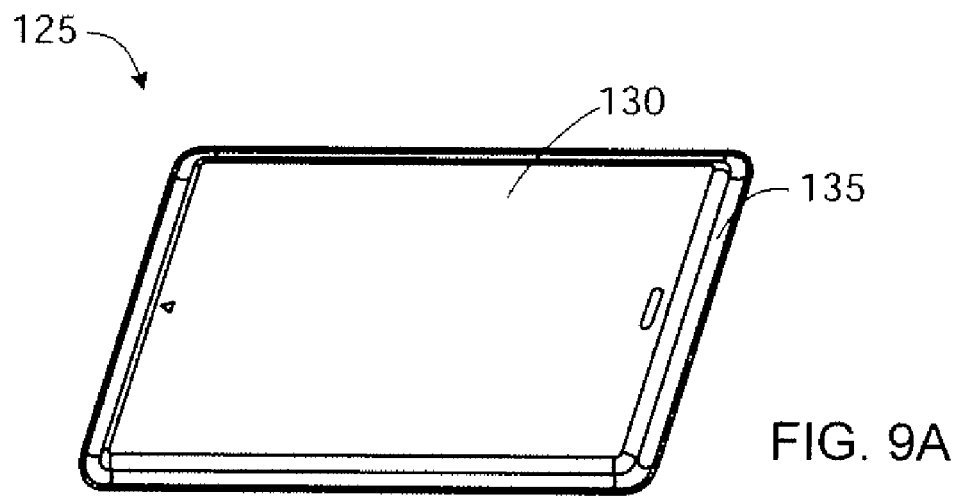
FIG. 9A depicts a side perspective view of an embodiment of a top-side of a cutting board shell.
Figure 9B:
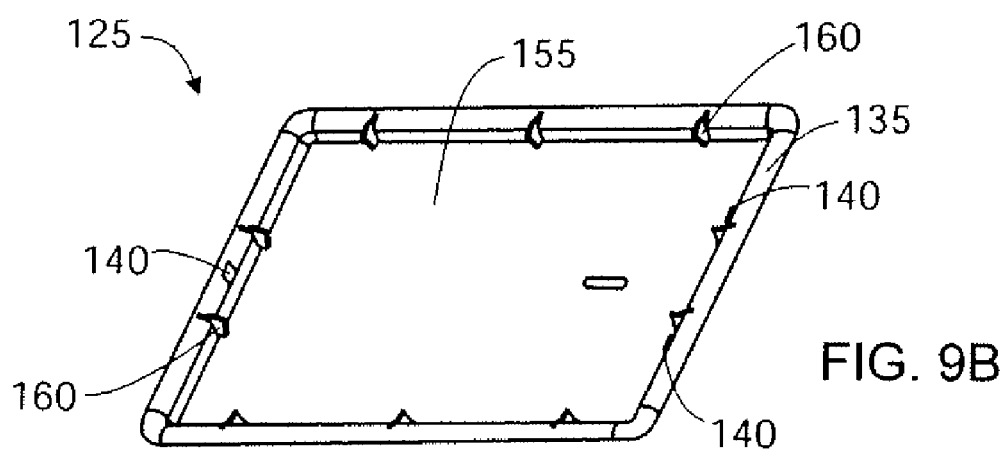
FIG. 9B depicts a side perspective view of an embodiment of a bottom-side of a cutting board shell.
Figure 9C:
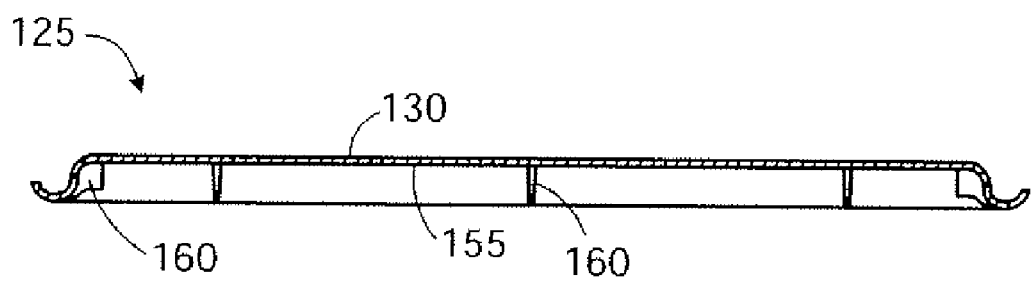
FIG. 9C depicts a cross-section of an embodiment of a cutting board shell.

The fins 160 also allow the shells 125 to be stacked so that the cutting surfaces 130 of the shells 125 are exposed to air when stacked on top of each other as shown in FIG. 7A. This is advantageous for drying the cutting surfaces 130 when cleaned, rinsed, and sanitized shells are dried. Air drying is required by most, if not all, state health codes that govern food service institutions such as restaurants, and is a key issue to consider in a state-of-the-art food safety program such as the Food and Drug Administration's Hazard Analysis and Critical Control Points (HACCP) system, which is designed to prevent, elimninate, or reduce to acceptable levels the microbial, chemical, and physical hazards associated with food production.

In embodiments, the shells may be a one piece injection molded unit comprising high density polyethylene. In still other embodiments, the rigid base may be machined from an extrusion. Fin alignment slots may be machined into the rigid base, and support structures (feet) may be attached after machining. Alternately, the base may be molded, such as by injection molding, so that the base is molded in one-step to include the slots and the feet in the for of bosses. Other methods of manufacturing the cutting board shells and the rigid base that are known now or hereafter to one of ordinary sill in the art are encompassed in embodiments herein, as are other materials, as discussed hereinabove.

In embodiments, the shell may incorporate an anti-microbial product, such as for example, but not limited to, Microban® from Microban International, Ltd. of Huntersville, N.C. The anti-microbial product may be built into or incorporated in the polymeric material of the shell. The anti-microbial product may inhibit the growth of bacteria in between cleaning and reduce staining, odors, and deterioration of the shells that may arise from the growth of bacteria in between cleaning of the shells.

Figure 10:
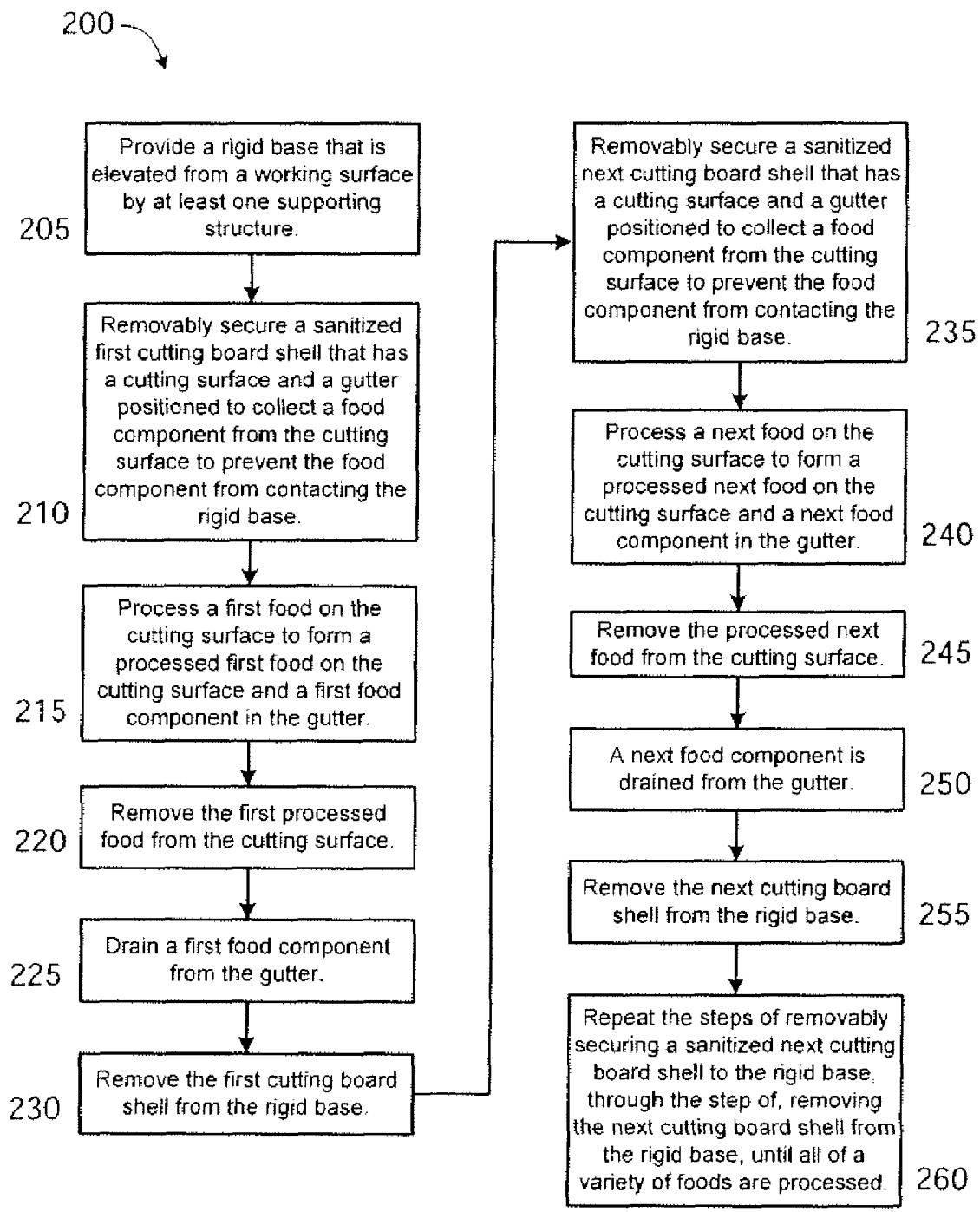
FIG. 10 is a flow chart of an exemplary method of hygienically processing a variety of foods.

Referring to FIG. 10, an exemplar method for hygienically processing a large quantity and variety of foods 200 is presented, A method may include providing a rigid base that is elevated from a working surface by at least one supporting structure 205. A sanitized first cutting board shell that has a cutting surface and a gutter positioned to collect a food component from the cutting surface to prevent the food component from contacting the rigid base is removably secured to the rigid base 210. A first food is processed on the cutting surface to form a processed first food on the cutting surface and a first food component in the gutter 215. The first processed food is removed from the cutting surface 220. A first food component is drained from the gutter 225. The first cutting board shell is removed from the rigid base 230. A sanitized next cutting board shell that has a cutting surface and a gutter positioned to collect a food component from the cutting surface to prevent the food component from contacting the rigid base is removably-secured to the rigid base 235. A next food is processed on the cutting surface to form a processed next food on the cutting surface and a next food component in the gutter 240. The processed next food is removed from the cutting surface 245. A next food component is drained from the gutter 250. The next cutting board shell is removed from the rigid base 255; and the steps of removably-securing a sanitized next cutting board shell to the rigid base, through the step of, removing the next cutting board shell from the rigid base, are repeated until all of a variety of foods are processed 260.

Advantages of embodiments of cutting board systems disclosed herein may include, but are not limited to any or all of the following: a one sided-cutting surface that cannot be used as a cutting board if flipped over, which is elevated from the countertop, and thus avoids contamination from towels used to stabilize traditional cutting boards or from the counter tops; a gutter with a drip edge prevents any food juices from contacting the rigid base; a board that is stabilized off the countertop on non-slip feet improving ergonomics for the food processor; a quickly changeable cutting surface that may be color coded for different processing different food types, and a rigid base that may be black in color, or a color other than the shells, to remind food processors not to cut or process food on the base; and the shells are conveniently stackable for air drying of the cutting surfaces after sanitization of the cutting surfaces.

It will be appreciated that various of the above-disclosed and other features and functions, or alternatives thereof, may be desirably combined into many other different systems or applications. Also that various presently unforeseen or unanticipated alternatives. modifications, variations or improvements therein may be subsequently made by those skilled in the art which are also intended to be encompassed by the following claims.

What is claimed is:

1. A cutting board system, comprising:
  a rigid base comprising a base top surface, a base bottom surface, and at least one base side contiguous and adjacent with the base top surface and the base bottom surface;
  a shell sized and shaped to fit over the base top surface, the shell comprising at least one securing structure that removably secures the shell to the base, a substantially flat cutting surface and a gutter positioned adjacent to the at least one base side, wherein the gutter is further positioned to prevent a food component from contacting the rigid; and a pliable sheet positioned between the base top surface and the shell.

2. The cutting board system of claim 1, further comprising a plurality of shells, wherein each of the plurality of shells is color-coded for a specific food type.

3. The cutting board system of claim 1, wherein the shell further comprises an anti-microbial agent.

4. The cutting board system of claim 1, wherein the at least one securing structure comprises at least one clamping mechanism, wherein a portion of the clamping mechanism is integral with the shell and positioned to clamp the shell to the rigid base.

5. The cutting board system of claim 1, wherein at least one support structure is affixed to the base bottom surface, wherein the at least one support structure is positioned to stably elevate the rigid base off a working surface.

6. The cutting board system of claim 1, wherein the gutter comprises an interior wall portion that extends downward from the cutting surface at an angle of about 0° to about 30°.

7. The cutting board system of claim 1 wherein the cutting surface is comprised of a matted polymeric material.

8. The cutting board system of claim 1:
wherein the rigid base further comprises at least one alignment slot;
wherein the shell further comprises a shell bottom side;
wherein the shell bottom side comprises at least one fin; and
wherein the at least one fin is positioned to fit into the at least one alignment slot of the rigid base.

9. The cutting board system of claim 8, wherein the at least one fin of each of the at least one shell is positioned to allow air drying of the cutting surface when shells are stacked on each other.

10. The cutting board system of claim 1, wherein the gutter comprises one or more pouring spouts.

11. A cutting board system, comprising:
a rigid base comprising at least one base top upper surface, a base bottom surface, at least one base side contiguous and adjacent with the base top upper surface and base bottom surface, at least one base top lower surface, and at least one lower base top side contiguous with the base top upper surface and the base top lower surface;
at least one shell sized and shaped to fit over the at least one base top upper surface, the shell comprising a securing structure that removably secures the at least one shell to the base, a substantially flat cutting surface and a gutter positioned adjacent to the at least one base side and the at least one lower base top side, wherein the gutter is further positioned to prevent a food component from contacting the rigid base; and
at least one pliable sheet positioned between the at least one base top upper surface and the at least one shell.

12. The cutting board system of claim 11, wherein at least one support structure is affixed to the base bottom surface, wherein the at least one support structure is positioned to stably elevate the rigid base off a working surface.

13. The cutting board system of claim 11, wherein the gutter further comprises an interior wall portion that extends downward from the cutting surface at an angle of about 0° to about 30°.

14. The cutting board system of claim 11 wherein the rigid base further comprises an insert.

15. The cutting board system of claim 11:
wherein the rigid base further comprises at least one alignment slot;
wherein the at least one shell further comprises a shell bottom surface;
wherein the shell bottom surface comprises at least one fin; and
wherein the at least one fin is positioned to fit into the at least one alignment slot of the rigid base.

16. The cutting board system of claim 15, wherein the at least one fin of each of the at least one shell is positioned to allow air drying of the cutting surface when shells are stacked on each other.

17. A method for hygienically processing a variety of foods, comprising:
providing a rigid base, wherein the rigid base is elevated from a working surface by at least one supporting structure;
removably securing a sanitized first cutting board shell to the rigid base;
wherein the first cutting board shell comprises a securing structure that removably secures the first cutting board shell to the base, a cutting surface and a gutter; and
wherein the gutter is positioned to collect a first food component from the cutting surface and to prevent the first food component from contacting the rigid base;
processing a first food on the cutting surface to form a processed first food on the cutting surface and the first food component in the gutter;
removing the processed first food from the cutting surface;
draining the first food component from the gutter;
removing the first cutting board shell from the rigid base;
removably securing a sanitized next cutting board shell to the rigid base;
wherein the next cutting board shell comprises a securing structure that removably secures the next cutting board shell to the base, a next cutting surface and a next gutter; and
wherein the next gutter of the next cutting board shell is positioned to collect a next food component from the next cutting surface and to prevent the next food component from contacting the rigid base;
processing a next food on the next cutting surface to form a processed next food on the cutting surface and the next food component in the next gutter;
removing the processed next food from the cutting surface;
draining the next food component from the gutter; and
removing the next cutting board shell from the rigid base.

18. The method of claim 17, further comprising repeating the steps of removably-securing a sanitized next cutting board shell to the rigid base, through the step of, removing the next cutting board shell from the rigid base, until all of a variety of foods are processed.

* * * * *

UNITED STATES PATENT AND TRADEMARK OFFICE
CERTIFICATE OF CORRECTION

| | | |
|---|---|---|
| PATENT NO. | : 7,533,875 B2 | Page 1 of 1 |
| APPLICATION NO. | : 11/737857 | |
| DATED | : May 19, 2009 | |
| INVENTOR(S) | : Richard Willen and Michael Lee Miller | |

It is certified that error appears in the above-identified patent and that said Letters Patent is hereby corrected as shown below:

In the claims, claim 1:

At column 11, line 5, please delete:

"rigid; and"

and replace it with:

--rigid base; and--

Signed and Sealed this
Fifth Day of February, 2013

Teresa Stanek Rea
*Acting Director of the United States Patent and Trademark Office*